United States Patent
Carlyle

[11] 3,799,649
[45] Mar. 26, 1974

[54] HAZE BARRIER FOR LIQUID CRYSTAL DISPLAY

[75] Inventor: James S. Carlyle, Santa Clara, Calif.

[73] Assignee: American Micro-Systems Incorporated, Santa Clara, Calif.

[22] Filed: Mar. 6, 1973

[21] Appl. No.: 338,590

[52] U.S. Cl............................. 350/160 LC, 53/43
[51] Int. Cl................................................ G02s 1/16
[58] Field of Search............ 350/160 LC; 53/43, 42, 53/319

[56] References Cited
UNITED STATES PATENTS
3,751,137    8/1973    Fitzgibbons.................. 350/160 LC
2,319,234    5/1943    Hothersall........................ 53/43

Primary Examiner—Ronald L. Wibert
Assistant Examiner—Paul K. Godwin
Attorney, Agent, or Firm—Roger W. Erickson

[57] ABSTRACT

A liquid crystal display device comprised of a pair of spaced apart glass plates joined together by a peripheral seal to form a planar cavity for liquid crystal material utilizes an internal barrier spaced from one end of the seal having a plugged opening. The barrier helps to prevent the plug from being pushed out and also reduces the migration of haze forming impurities from the plug into the cavity.

4 Claims, 4 Drawing Figures

PATENTED MAR 26 1974 3,799,649
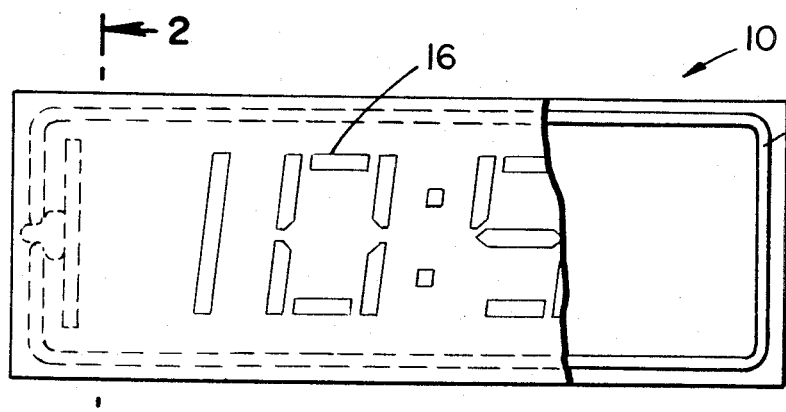
FIG_1
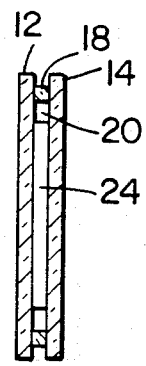
FIG_2
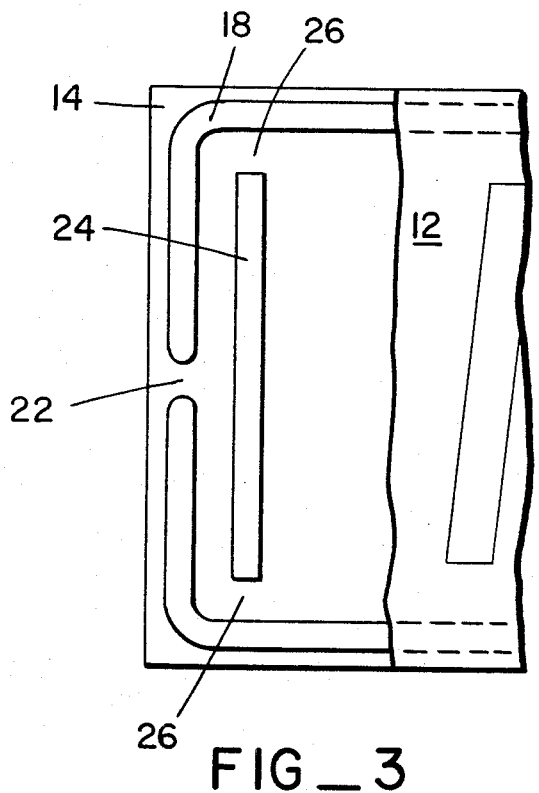
FIG_3
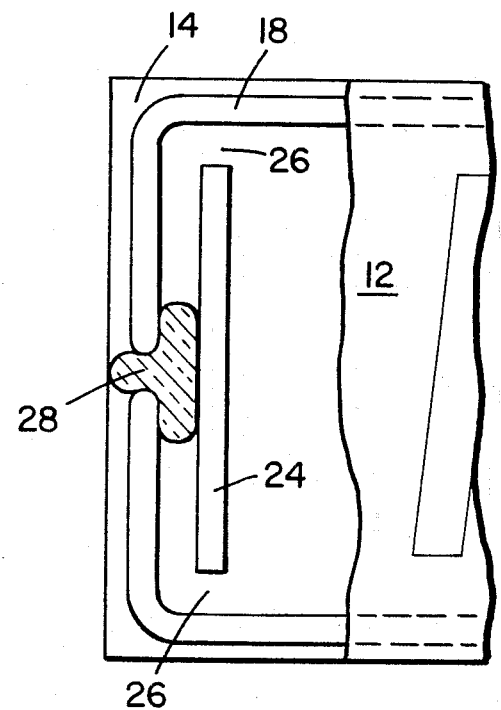
FIG_4

HAZE BARRIER FOR LIQUID CRYSTAL DISPLAY

In liquid crystal display devices generally comprising a pair of glass plates that are spaced apart to form a planar cavity and joined together around the periphery of this cavity by a bonding material which solidifies upon heating and curing to form a hard sealing joint. The liquid crystal material is normally admitted into the cavity through an opening at one end of the sealing joint of the display device after which the opening itself must be sealed. Heretofore, this was accomplished by means of a plug of some suitable material such as a silicone compound. However, use of the aforesaid plug caused certain serious problems which detracted from the utility and life of the display package. For one thing the plug was difficult to form within its opening so that it would not blow out or be pushed out when the display was subjected to relatively high temperature levels. Another problem arose because of impurities that were formed by or around the plug which migrated into the display cavity and caused a hazing condition. This hazing or clouding of the display rapidly decreased its usefulness, and prior to the present invention it often occurred in the early life of the display. A major object of the present invention is to provide a solution to the aforesaid "push-out" and "haze" problems. Yet another object of the invention is to provide a liquid crystal display structure that is durable and lasting and will withstand relatively high temperatures without causing failure of the plug in the opening required to fill the display with liquid crystal.

Another more specific object of the present invention is to provide a liquid crystal display that will either eliminate or substantially reduce the generation and migration of haze into the useable area of the display.

BRIEF SUMMARY OF THE INVENTION

In a liquid crystal display a pair of glass plates are held together and spaced apart by a peripheral seal of glass or plastic bonding material thereby forming a planar cavity within the seal that must be filled with liquid crystal material. As in conventional liquid crystal displays the inside surfaces of the plates are coated with layers of conductive material, the layer on one plate being in the form of segmented master characters with lead paths extending to bonding pads along one side of the display. The conductive layer on the opposite plate forms a pattern providing a ground plane for the segmented characters. When the peripheral seal is formed, it is provided with an opening, preferably at one end through which the liquid crystal passes in filling the cavity between the plates. According to the invention a narrow barrier is spaced inwardly from this opening and extends generally parallel to the side of the seal containing the opening. This barrier is preferably made of the same material as the seal and may be formed at the same time, that is, when the plates are bonded together. The ends of the barrier are spaced from opposite sides of the seal so that liquid crystal material can get around it when the display is being filled. When the display is filled, its opening is closed by a plug of plastic material which is forced into it until it encounters the barrier and is deformed before setting or hardening.

Other objects, advantages and features of the present invention will become apparent from the following detailed description of one embodiment presented in conjunction with the accompanying drawing.

BRIEF DESCRIPTION OF THE DRAWING

FIG. 1 is a front view in elevation of a liquid crystal display embodying the principles of the present invention, with portions broken away to show internal structure;

FIG. 2 is a view in section taken along line 2—2 of FIG. 1;

FIG. 3 is an enlarged fragmentary view of the display of FIG. 1 showing one end with a portion of the front plate removed before the sealing plug is in place; and FIG. 4 is a view similar to FIG. 3 showing the display after the sealing plug has been installed.

DESCRIPTION OF PREFERRED EMBODIMENT

With reference to the drawing, FIGS. 1 and 2 show a typical liquid crystal display 10 embodying the principles of the present invention. Generally, such a display comprises a pair of glass plates 12 and 14 each of which has a layer of conductive material such as tin oxide on its inside surface. On one plate the conductive layer may be shaped in a predetermined pattern such as a series of segmented master characters capable of forming the various numerals 16 when various combinations of segments are activated. The conductive layer (not shown) on the other plate is connected to ground potential and appropriately shaped and aligned to form a ground contact for all of the character segments.

The two glass plates are spaced apart but interconnected and held together by a peripheral seal 18 made of glass or some other hardenable plastic material. This seal extends essentially around the entire periphery of the display and out near the edges of the plates. The thickness of the seal is uniform so that the plates are spaced evenly apart to form a planar cavity between them which must be filled with liquid crystal material 20.

At one end of the display 10, the seal 18 is formed with an opening 22, as shown in FIG. 3. Spaced from this opening and extending parallel to the end of the seal containing the opening is a barrier 24. This barrier may be made of the same material as the seal end preferably is formed at the same time, i.e. when the plates are brought together and bonding seal is cured. The ends of the barrier are spaced from the opposite top and bottom portions of the seal so that openings 26 are formed which are large enough to allow fluid to flow around the barrier. After the liquid crystal material has been put into the display cavity the opening 22 is closed, as shown in FIG. 4 by a plug member 28. This plug member may be a suitable plastic material such as a silicone compound and it is inserted into the opening while still in its unhardened state. As the plug is inserted it bears against the barrier and is caused to flow in opposite directions along it, thereby forming a T-shape configuration. When the plug compound cures and hardens the T-shape in combination with the barrier, it provides several important advantages.

For one thing, when the completed display is subjected to above normal temperature conditions any internal pressure buildup of the liquid crystal material will not seriously affect the plug or tend to dislodge it. The barrier 24 prevents any fluid pressure from being applied to the plug directly in front of the opening in a direction that would normally tend to push out the plug. Instead, the internal fluid pressure must extend around the ends of the barrier and consequently it acts on opposite sides of the plug which does not tend to push it out.

Another advantage of the barrier 24 is that it substantially prevents or reduces the migration of impurities from the plug material into the display cavity. Heretofore, such impurities which gradually are created by the reaction of the plug material and the liquid crystal material created a haze condition which spread throughout the cavity and eventually destroyed the effectiveness of the display. With the barrier 24 in place according to the present invention, the flow of liquid crystal material around the plug is reduced and if haze inducing impurities are formed they must travel to the ends of the barrier and around it before getting into the major part of the display cavity. Thus, by preventing or slowing any haze migration the life of the liquid crystal display is greatly increased.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a liquid crystal display comprised of a pair of glass plates spaced evenly apart and bonded together by a peripheral seal to form a cavity between the plates, said cavity containing liquid crystal material and said seal having a small opening through which said liquid crystal material is introduced into said cavity between the plates, the improvement comprising an elongated internal barrier member spaced inwardly from said seal opening, said barrier member occupying the space between said plates along its length and said length terminating at ends spaced from opposite sides of said peripheral seal opening, and a plug member in said seal opening.

2. The liquid crystal display as described in claim 1 wherein said plug member extends through said opening and abuts against said barrier member.

3. The liquid crystal display as described in claim 1 wherein said plug member abuts against said barrier member and has a generally T-shaped configuration.

4. The liquid crystal display as described in claim 1 wherein said barrier member is made of the same material as said peripheral seal.

* * * * *